(12) United States Patent
Kim

(10) Patent No.: US 7,852,547 B2
(45) Date of Patent: Dec. 14, 2010

(54) ELECTRO-WETTING DISPLAY PANEL AND METHOD OF MANUFACTURING THE SAME

(75) Inventor: Jun-Hyung Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 642 days.

(21) Appl. No.: 11/453,643

(22) Filed: Jun. 14, 2006

(65) Prior Publication Data

US 2006/0285067 A1 Dec. 21, 2006

(30) Foreign Application Priority Data

Jun. 15, 2005  (KR) ...................... 10-2005-0051522

(51) Int. Cl.
*G02B 26/00* (2006.01)
*G09G 3/34* (2006.01)

(52) U.S. Cl. .................... 359/296; 345/107; 345/88; 349/89

(58) Field of Classification Search .................... 349/89; 345/107, 3.1, 49, 55, 71, 72, 84, 88; 359/296
See application file for complete search history.

(56) References Cited

U.S. PATENT DOCUMENTS 7,420,549 B2 * 9/2008 Jacobson et al. ............. 345/3.1

FOREIGN PATENT DOCUMENTS

WO         2005-038764 A1    4/2005

\* cited by examiner

*Primary Examiner*—Evelyn A. Lester
(74) *Attorney, Agent, or Firm*—Innovation Counsel LLP

(57) ABSTRACT

An active matrix type electro-wetting display panel includes an array substrate that includes the switching devices and pixel electrodes, an opposite substrate having a common electrode and a conductive colored liquid filled in the spaces corresponding to the pixel electrodes to control light transmissivity according to the potential differences between the pixel electrodes and the common electrode.

12 Claims, 25 Drawing Sheets

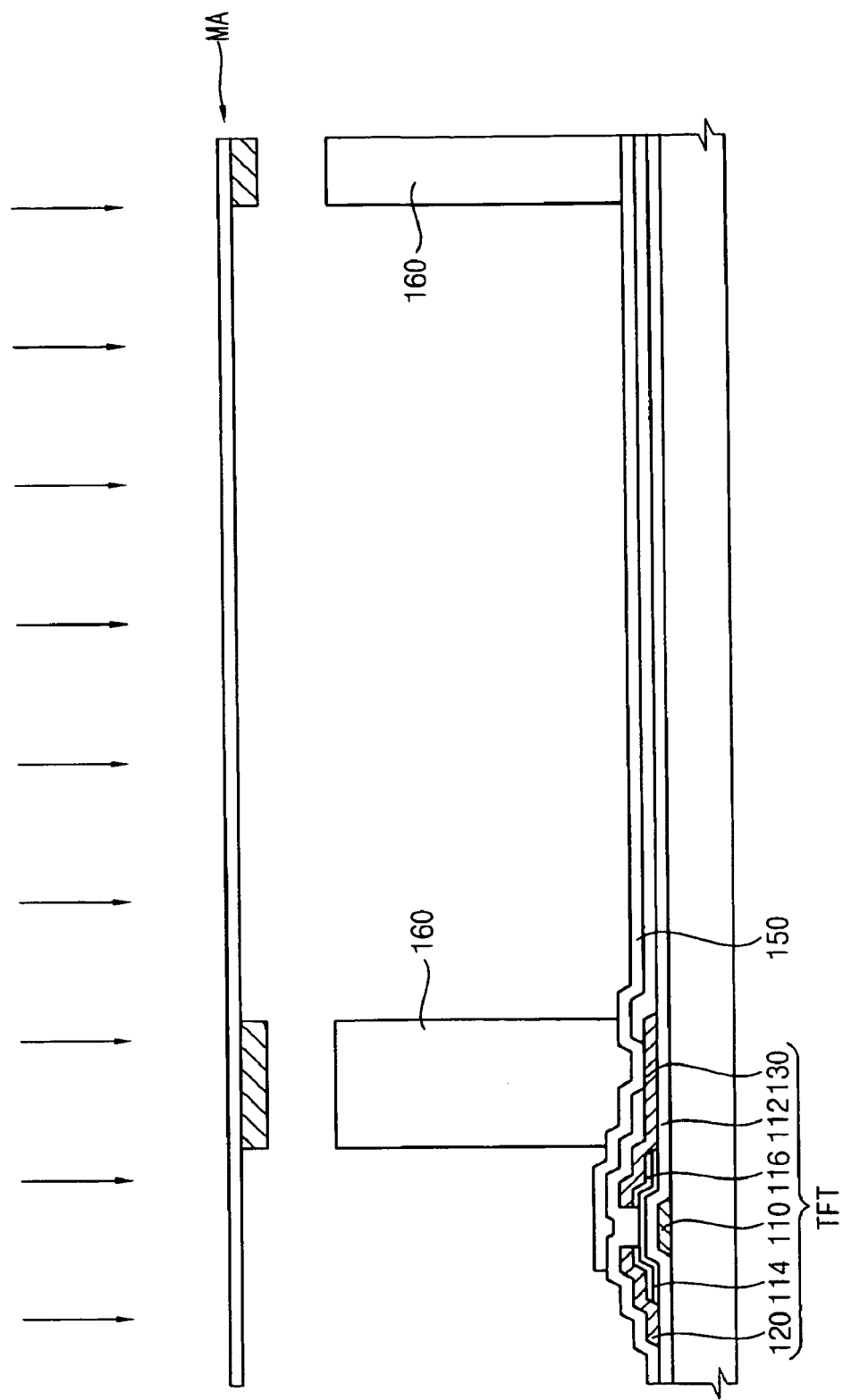

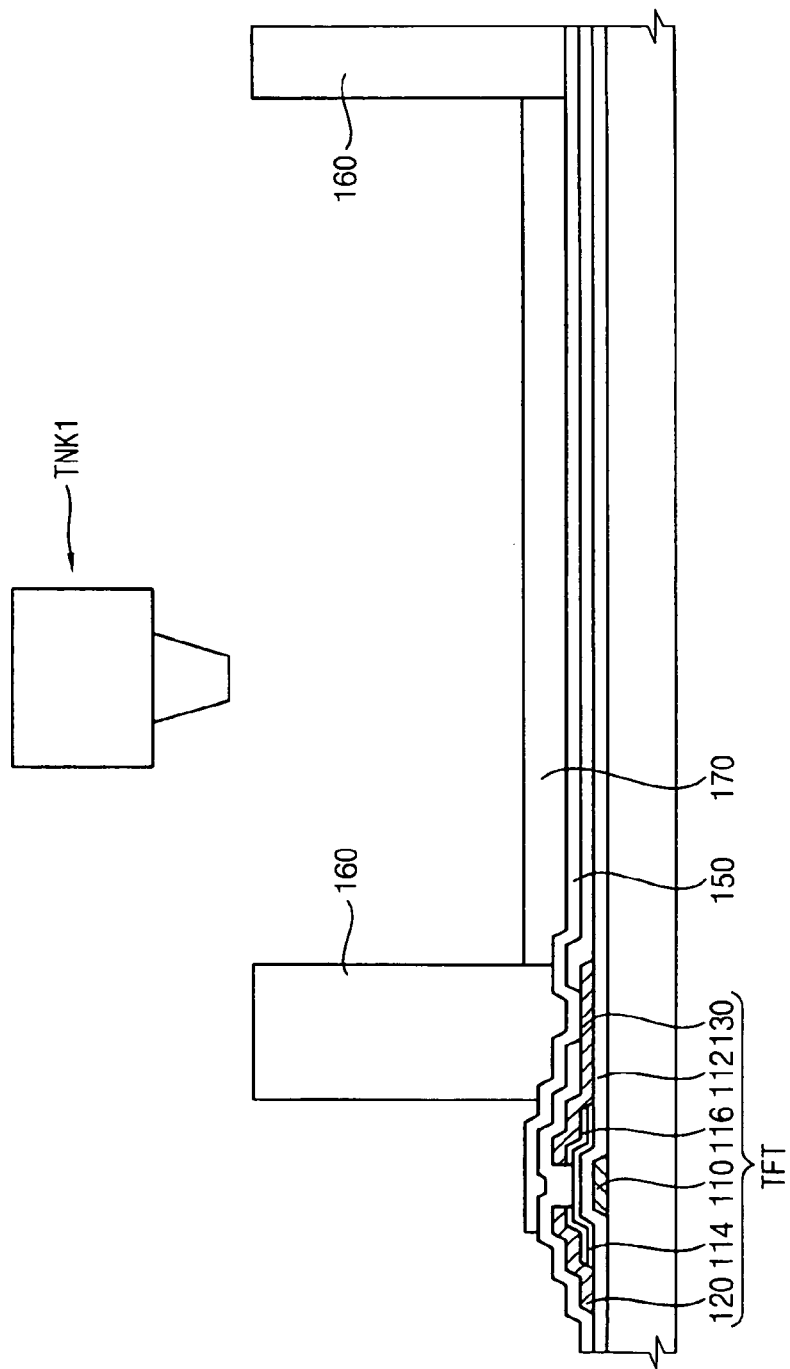

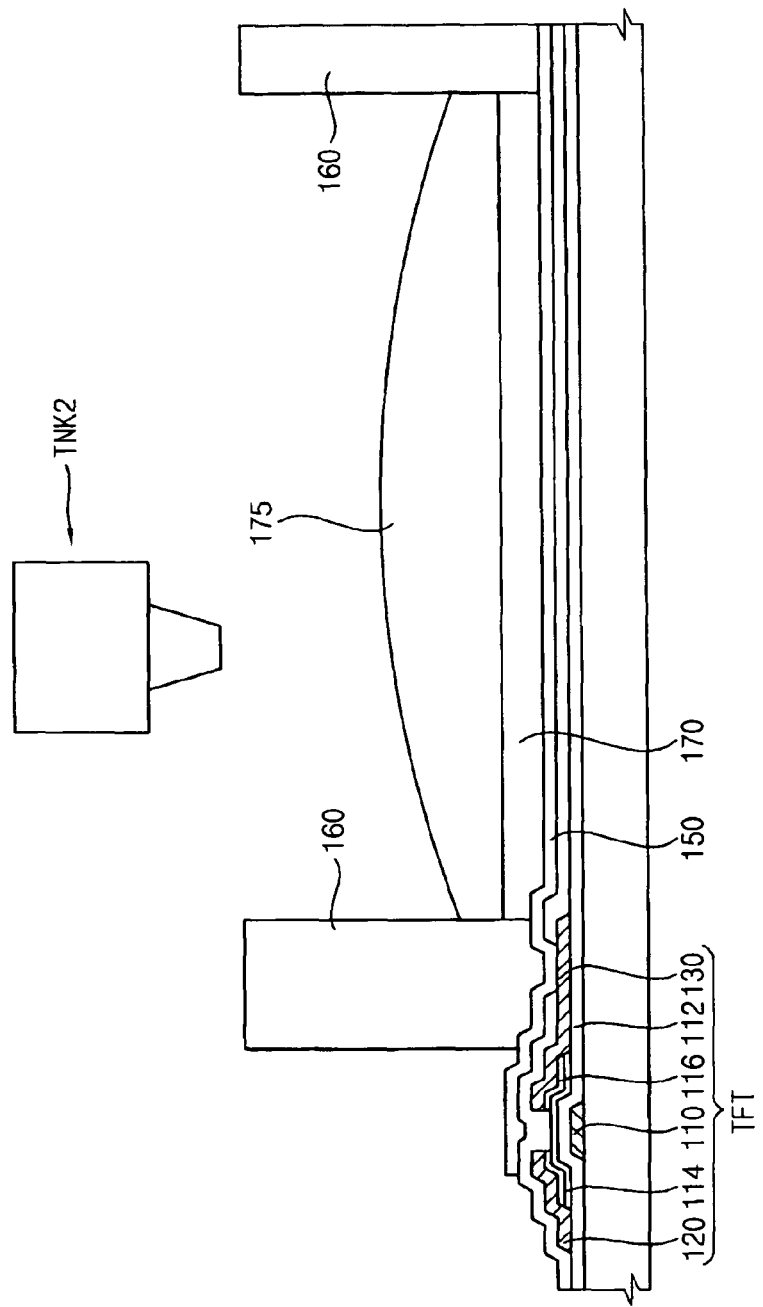

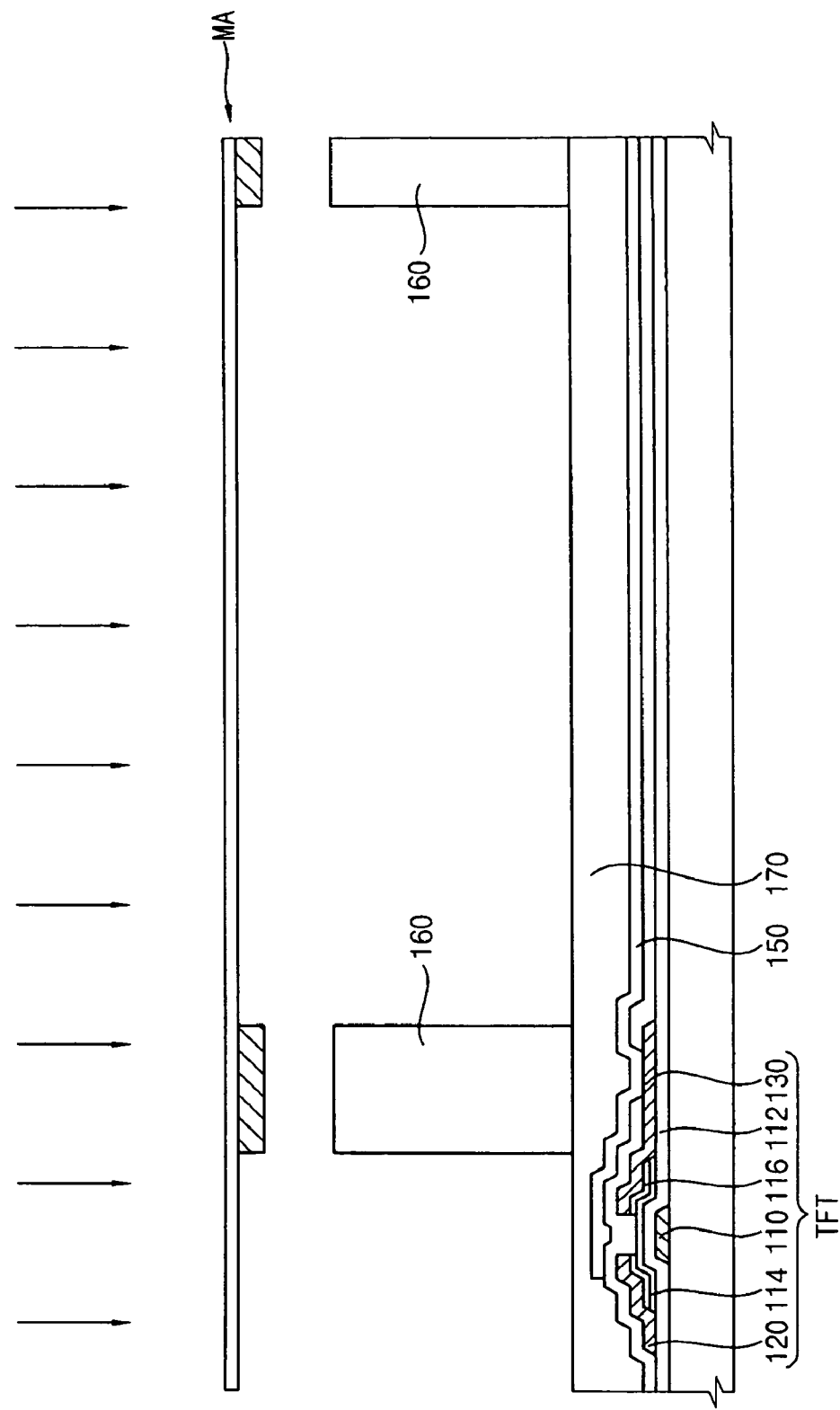

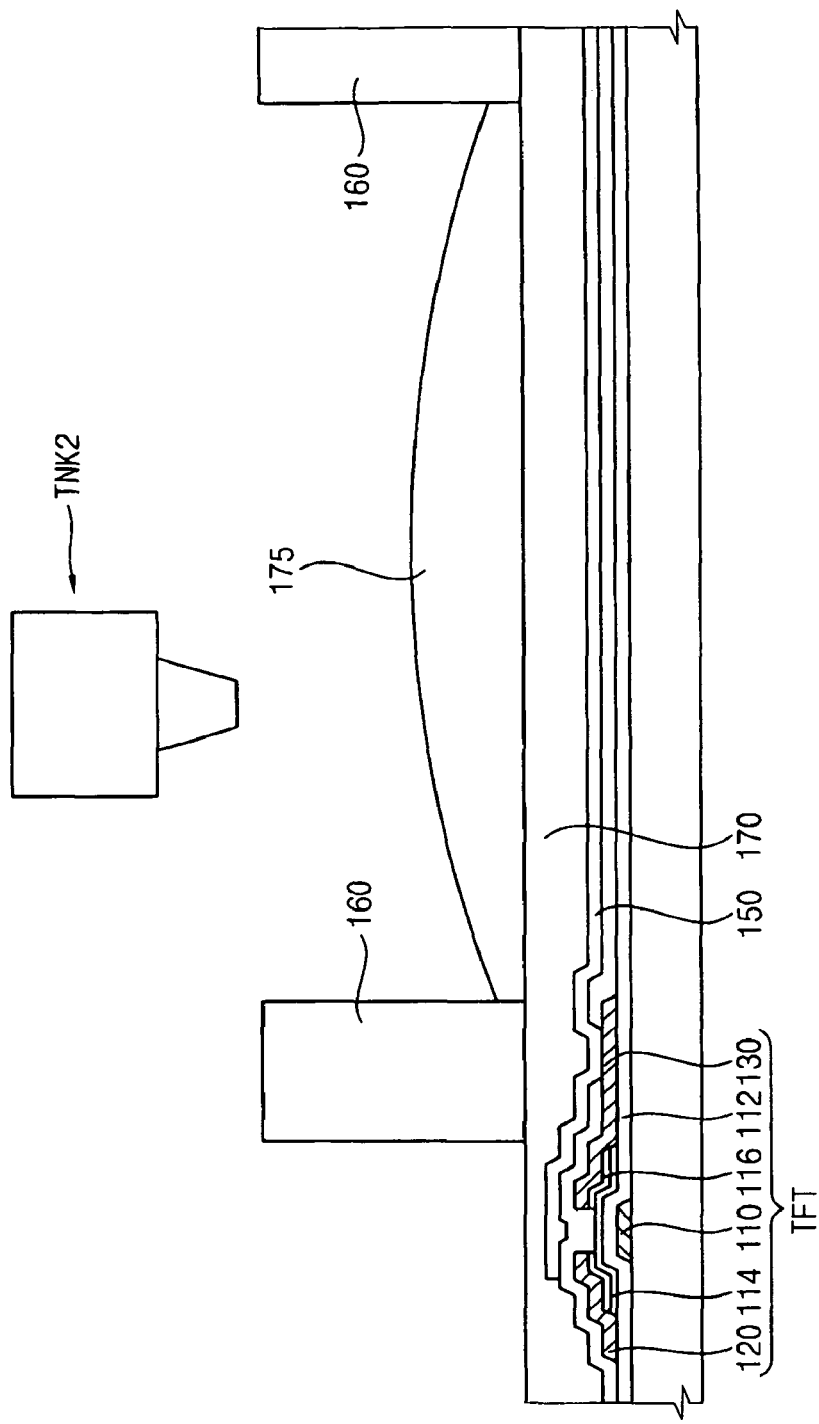

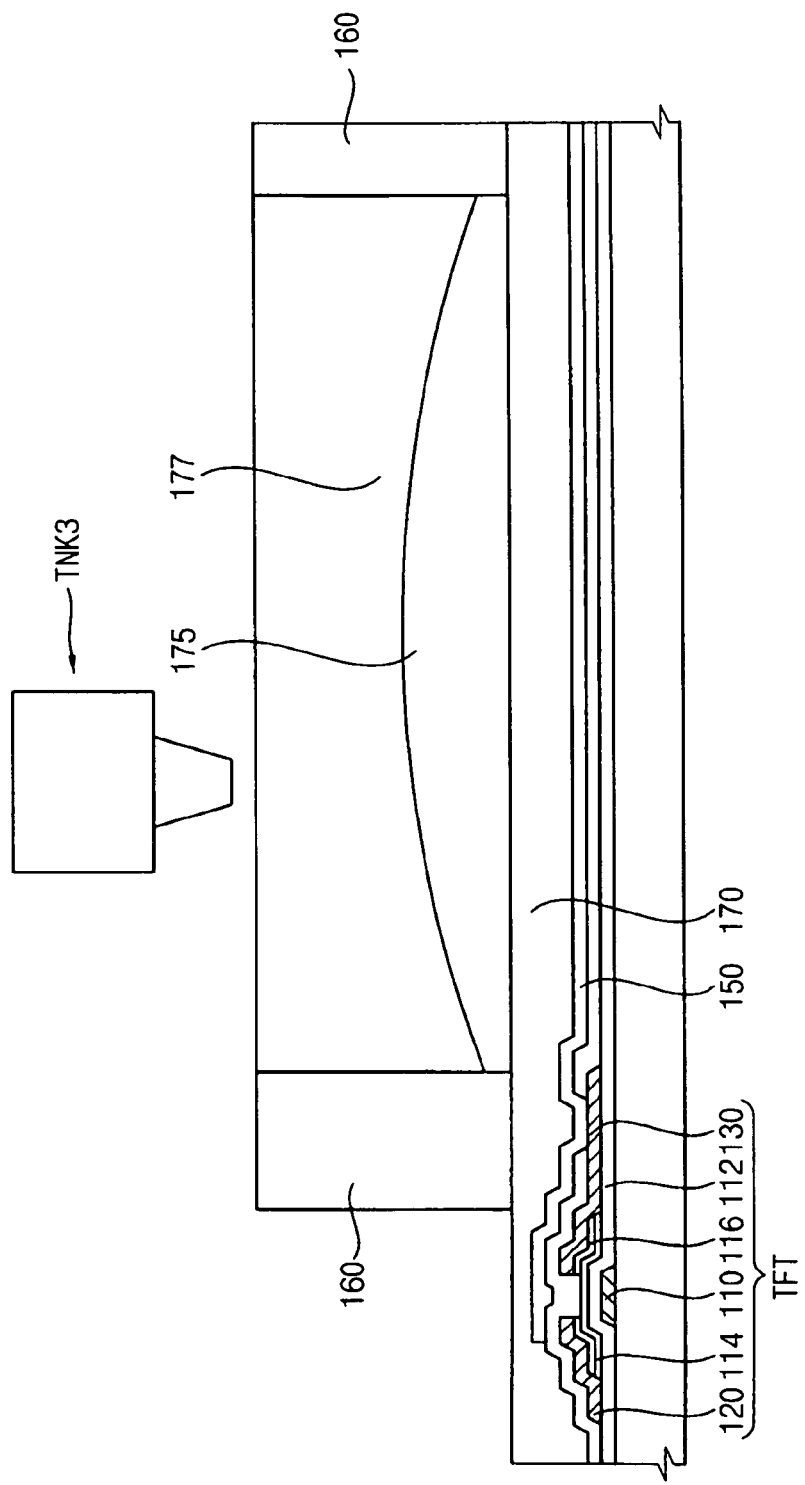

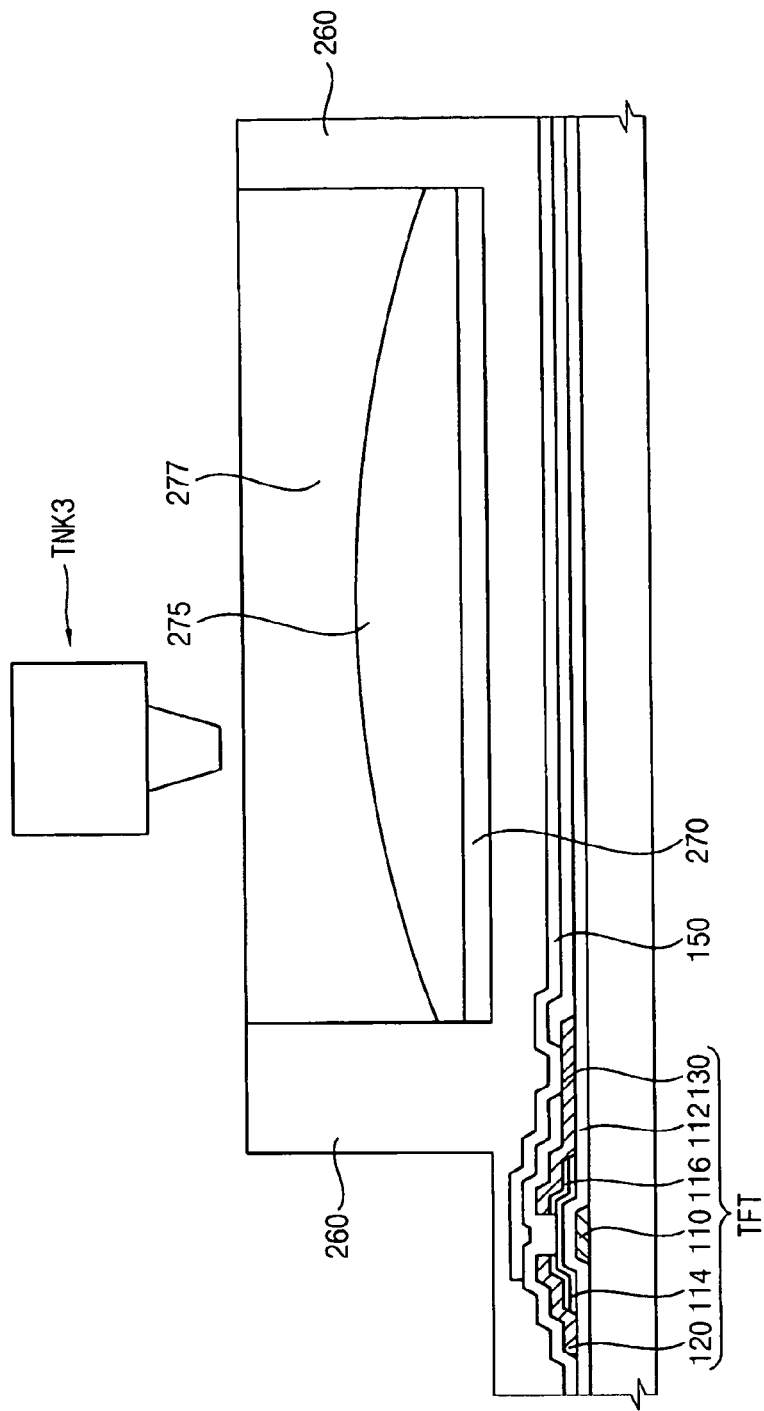

ELECTRO-WETTING DISPLAY PANEL AND METHOD OF MANUFACTURING THE SAME

CROSS-REFERENCE TO RELATED APPLICATIONS

This application claims priority under 35 U.S.C. §119 to Korean Patent Application no. 2005-51522, filed on Jun. 15, 2005, the contents of which are herein incorporated by reference in their entirety.

FIELD OF THE INVENTION

The present invention relates to an electro-wetting display panel and, more particularly, to an active matrix type electro-wetting display panel and a method of manufacturing same.

BACKGROUND OF THE INVENTION

Generally, electro-wetting is a technique employed in reflective type displays that changes the surface tension of an aqueous liquid by applying a voltage to it. For example, when a voltage is applied to a one pixel confined space comprising a waterproof insulator, an electrode, an aqueous liquid and a non-aqueous liquid, the surface tension of the non-aqueous liquid changes so that the non-aqueous liquid moves. When a positive voltage is applied to the liquid including the aqueous liquid and non-aqueous colored liquid and a negative voltage is applied to the insulator, the non-aqueous colored liquid moves to one side to change the reflected light, thereby adjusting the color.

An electro-wetting display device made by Dr. Robert A. Hayes at Philips Research Laboratories is described in vol. 25 of Nature at pp. 383-385, 25 Sep. 2003, includes a white substrate, a transparent electrode, a hydrophobic insulator, a colored oil, water and a metallic electrode capable of applying a voltage to the water. In the above electro-wetting display device, several components operate in a passive matrix mode. The electro-wetting display device has fast response time of no more than about 10 ms, a high reflectivity of about 40%, a contrast ratio (C/R) of about 15, low power consumption and high resolution characteristics of no more than about 160 dpi (dots per inch).

SUMMARY OF THE INVENTION

According to one aspect of the present invention, there is provided an electro-wetting display panel including an array substrate, an opposite substrate and a conductive colored liquid. The array substrate has a switching device and a pixel electrode electrically connected to the switching device. An opposite substrate faces the array substrate. A conductive colored liquid is filled in a region corresponding to the pixel electrode. The conductive colored liquid is transformed according to an electrical signal applied to the pixel electrode to control light transmissivity. According to another aspect of the present invention, there is provided an electro-wetting display panel including a first substrate, a pixel electrode, a partition wall, a hydrophobic insulation layer, a conductive colored liquid, a second substrate and a switching device. The first substrate includes a pixel region. The pixel electrode is formed on the pixel region. The partition wall is formed by a predetermined height surrounding an edge of the pixel electrode. The hydrophobic insulation layer is formed on the pixel electrode surrounded by the partition wall. The conductive colored liquid is filled in a region defined by the partition wall. A second substrate encloses the conductive colored liquid contained by the partition wall through combining the first substrate. The switching device is formed on the first substrate providing an electric signal to the pixel electrode in order to cause spreading or contraction of the conductive colored liquid. According to another aspect of the present invention, there is provided a method of manufacturing an electro-wetting display panel. In the method of manufacturing an electro-wetting display panel, a partition wall defining a unit pixel region is formed on a first substrate where a switching device and a pixel electrode connected to the switching device are formed. A hydrophobic insulation layer is formed in the unit pixel region. A space defined by the partition wall is filled with a non-aqueous colored liquid and an aqueous colored liquid. The space defined by the partition wall is then enclosed with the second substrate. According to the present invention, the active matrix type array substrate is used for a lower substrate so that costs and time for manufacturing the electro-wetting display panel may be reduced.

BRIEF DESCRIPTION OF THE DRAWINGS

The above and other features and advantages of the present invention will become more apparent by describing in detailed example embodiments thereof with reference to the accompanying drawings, in which:

FIGS. 7A to 7F are cross-sectional views illustrating a method of manufacturing an electro-wetting display panel in accordance with a first example embodiment of the present invention;

FIGS. 8A to 8F are cross-sectional views illustrating a method of manufacturing an electro-wetting display panel in accordance with a second example embodiment of the present invention; and FIGS. 9A to 9G are cross-sectional views illustrating a method of manufacturing an electro-wetting display panel in accordance with a third example embodiment of the present invention.

DETAILED DESCRIPTION

Figure 1:
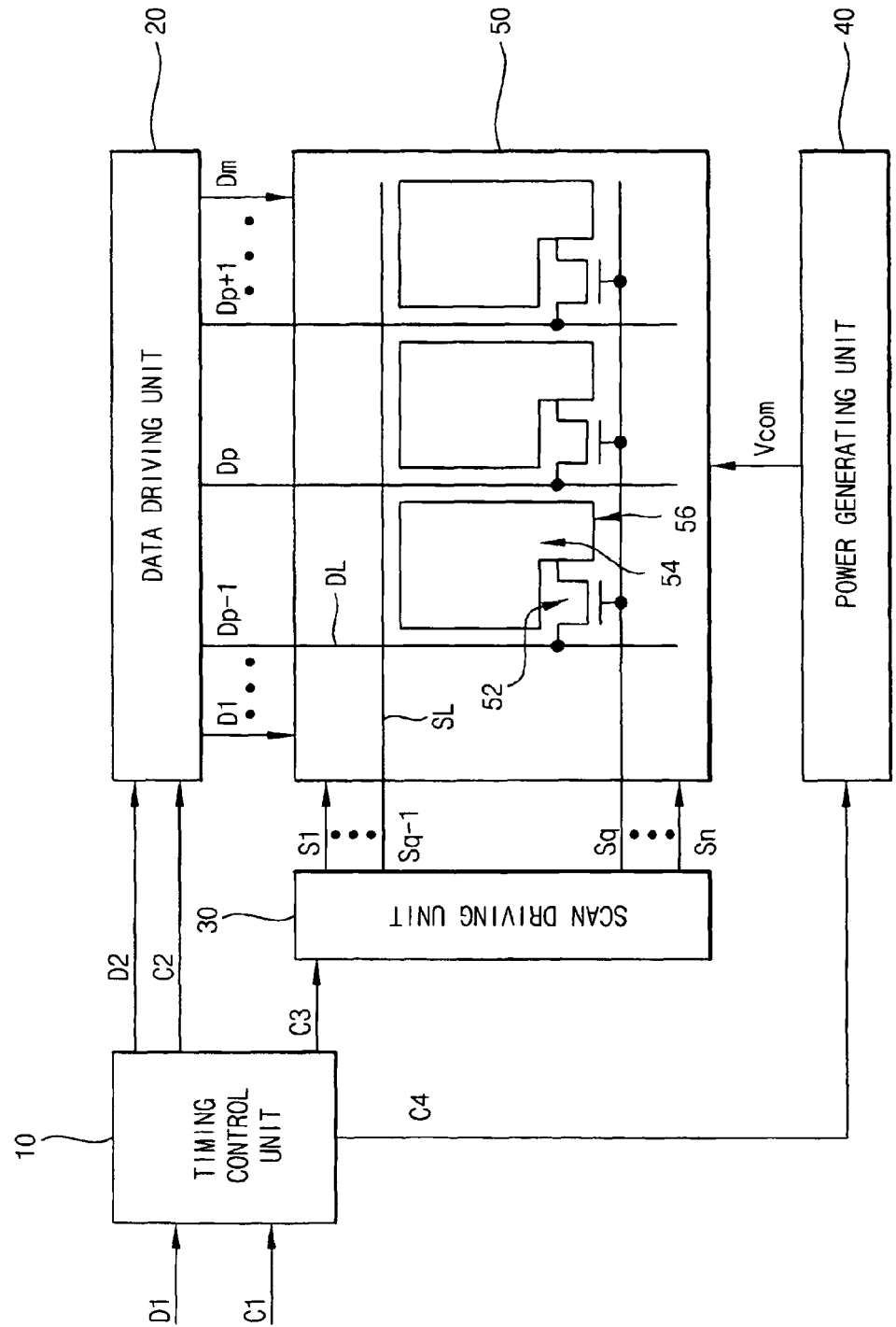
FIG. 1 is a block diagram illustrating an electro-wetting display panel in accordance with an example embodiment of the present invention.

The present invention is described more fully hereinafter with reference to the accompanying drawings, in which example embodiments of the present invention are shown. In the drawings, the sizes and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, the electro-wetting display device in accordance with this example embodiment of the present invention includes a timing control unit 10, a data driving unit 20, a scan driving unit 30, a power generating unit 40 and an electro-wetting display panel 50. The timing control unit 10 receives first gray scale data signal D1 and a first control signal C1 from an image data source such as an external graphics controller. The timing control unit 10 then outputs a second gray scale data signal D2 and a second control signal C2 to the data driving unit 20, a third control signal C3 to the scan driving unit 30, and a fourth control signal C4 to the power generating unit 40. For example, the first control signal includes a vertical synchronous signal $V_{sync}$, a horizontal synchronous signal $H_{sync}$, a data enable signal DE and a main clock $M_{CLK}$. The second control signal C2 includes a load signal LOAD and a start horizontal signal STH.

The data driving unit 20 converts the second data signal D2 provided from the timing control unit 10 into a corresponding gray scale voltage (i.e., a data voltage). The data driving unit 20 then provides the plural data signals $D_1, \ldots, D_{p-1}, D_p, D_{p+1}, \ldots, D_m$ to the electro-wetting display panel 50. The scan driving unit 30 provides the electro-wetting display panel 50 with gate-on-voltages $S_1, \ldots, S_{q-1}, S_q, \ldots S_n$ sequentially according as the third control signal C3 is applied to the scan driving unit 30. The power generating unit 40 provides the electro-wetting display panel 50 with a common electrode voltage $V_{com}$ according as the fourth control signal C4 is applied to the power generating unit 40. Although it is not particularly illustrated in the drawings, the power generating unit 40 generates and provides power, which is required in the timing control unit 10, the data driving unit 20 or the scan driving unit 30, to the timing control unit 10, the data driving unit 20 or the scan driving unit 30. The electro-wetting display panel 50 has m data lines (i.e., source lines) DL in order to transmit the data voltage and n scan lines (i.e., gate lines or injecting lines) SL in order to transmit a gate-on signal.

A region surrounded by adjacent data lines and adjacent scan lines defines a pixel. A thin-film transistor 52, a pixel electrode 54 and a partition wall 56 are formed in each of the pixels. A gate electrode and a source electrode of the thin-film transistor are electrically connected to the scan lines and data lines, respectively. Pixel electrode 54 is electrically connected to a drain electrode of thin-film transistor 52. Partition wall 56 surrounds an outer region of pixel electrode 54 and forms a predetermined space. A conductive colored liquid or a conductive water drop, which is illustrated later, is deposited in the predetermined space. The conductive colored liquid spreads or contracts to display an image in response to an applied potential difference between the pixel electrode 54 and a common electrode (not shown) positioned over the pixel electrode 54. The common electrode voltage $V_{com}$ is applied to the common electrode.

Figure 2:
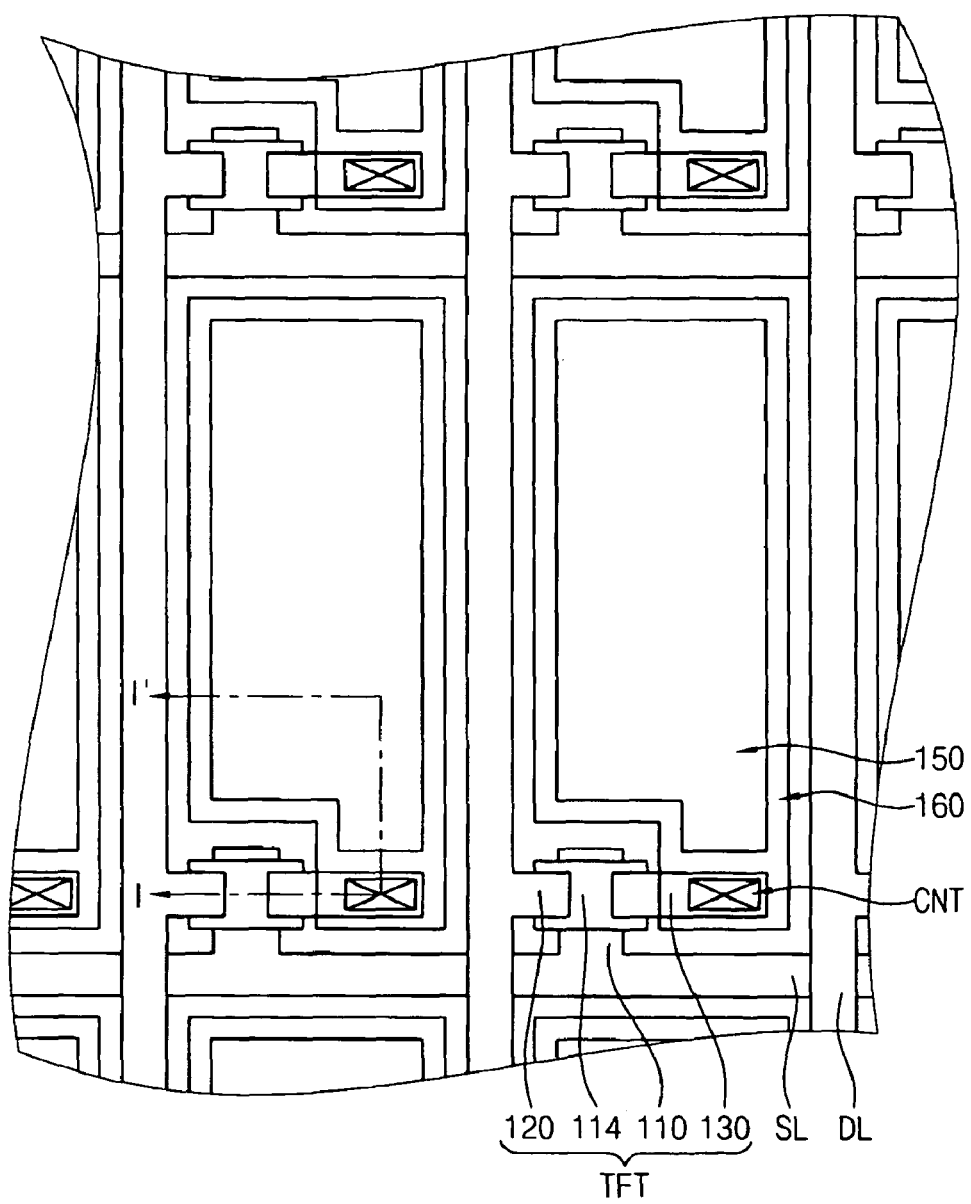
FIG. 2 is a plan view illustrating unit pixels of the electro-wetting display panel in FIG. 1.
Figure 3:
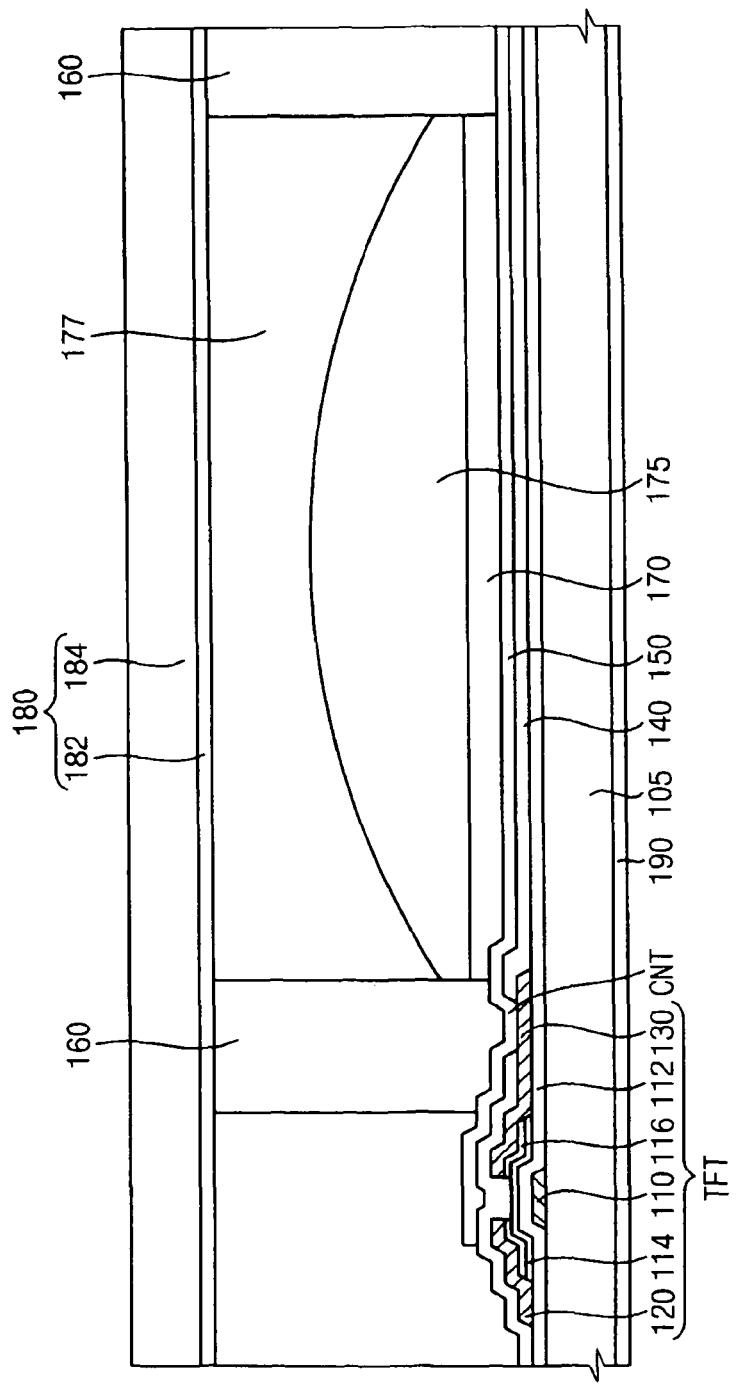
FIG. 3 is a cross-sectional view taken along a line I-I' in FIG. 2.

FIG. 2 is a plan view illustrating unit pixels of the electro-wetting display panel illustrated in FIG. 1. FIG. 3 is a cross-sectional view taken along a line I-I' in FIG. 2. Referring to FIGS. 2 and 3, a horizontal scan line SL and a gate electrode 110 protruded from the scan line SL are formed on a first transparent substrate 105. The first transparent substrate 105 may be a rigid type or a flexible type such as a film or plastic. The rigid type substrate may include a glass substrate, a quartz substrate, a glass ceramic substrate, a crystalline glass substrate, etc. The material used for the first transparent substrate 105 preferably has resistance to high temperatures employed in the manufacturing process.

A gate insulation layer 112 is formed on the scan line SL and the gate electrode 110. An active layer including semiconductor layer 114 and an impurity semiconductor layer 116 is formed on the gate electrode 110. A longitudinal data line DL, a source electrode 120 and a drain electrode 130 are formed on the gate insulation layer 112 and the active layer. Source electrode 120 partially covers some regions of the active layer. Drain electrode 130 is spaced apart from the source electrode 120 and covers other regions of the active layer. The gate electrode 110, the semiconductor layer 114, the impurity semiconductor layer 116, the source electrode 120 and the drain electrode 130 define a thin-film transistor (TFT). A passivation layer 140 is formed on the thin-film transistor and the gate electrode 112. The passivation layer 140 is partially opened and exposes the drain electrode of the thin-film transistor.

A pixel electrode 150 including conductive oxide such as indium tin oxide (ITO) is electrically connected to the drain electrode 130 through a contact hole opening (CNT) through passivation layer 140. A partition wall 160 having a predetermined height surrounds edge regions of the pixel electrode 150. The highest points of each of the partition walls may be arranged by substantially the same intervals on substantially the same plane.

In one example, partition wall 160 has a closed loop shape surrounding the unit pixel region. In another example, the partition wall 160 is connected to an adjacent partition wall surrounding a unit pixel region. Accordingly, the adjacent partition walls 160 may be overlaid to correspond to the scan lines SL and data lines DL surrounding the unit pixel region. A hydrophobic insulation layer 170 is formed on a bottom face of the predetermined spaces defined by the partition wall 160. The partition wall 160 may be formed by a photo process or an imprint process (i.e., a stamp process) on an organic layer. The hydrophobic insulation layer 170 may be formed by a spin-coating process or an inkjet injection process.

The region surrounded by partition wall 160 and hydrophobic insulation layer 170 is filled with a conductive colored liquid (i.e., a conductive water drop) that is a mixture of a non-aqueous liquid 175 and an aqueous liquid 177. The non-aqueous liquid 175 may preferably be a colored oil that may red color, blue or green in color. Partition wall 160 serves as a spacer for maintaining a cell gap between an array substrate and an opposite substrate 180 as well defining a container for receiving the conductive colored liquid. Because the partition wall 160 serves as a spacer, the partition wall 160 may be formed from the regions excluding the thin-film transistor to the edge regions of the pixel electrode in order to maximally use a space between the data lines or between the scan lines.

Opposite substrate 180 includes a transparent substrate 182 and a common electrode 184 formed on the transparent substrate 182. The common electrode 184 is connected to a common electrode voltage ($V_{com}$) provided to each pixel. The conductive colored liquid filled in the unit pixel region spreads or contracts in response to a potential difference between a data voltage applied to the pixel electrode 150 and the common electrode voltage ($V_{com}$) applied to the common electrode 184 illustrated in FIGS. 5A and 5B.

Figure 4:
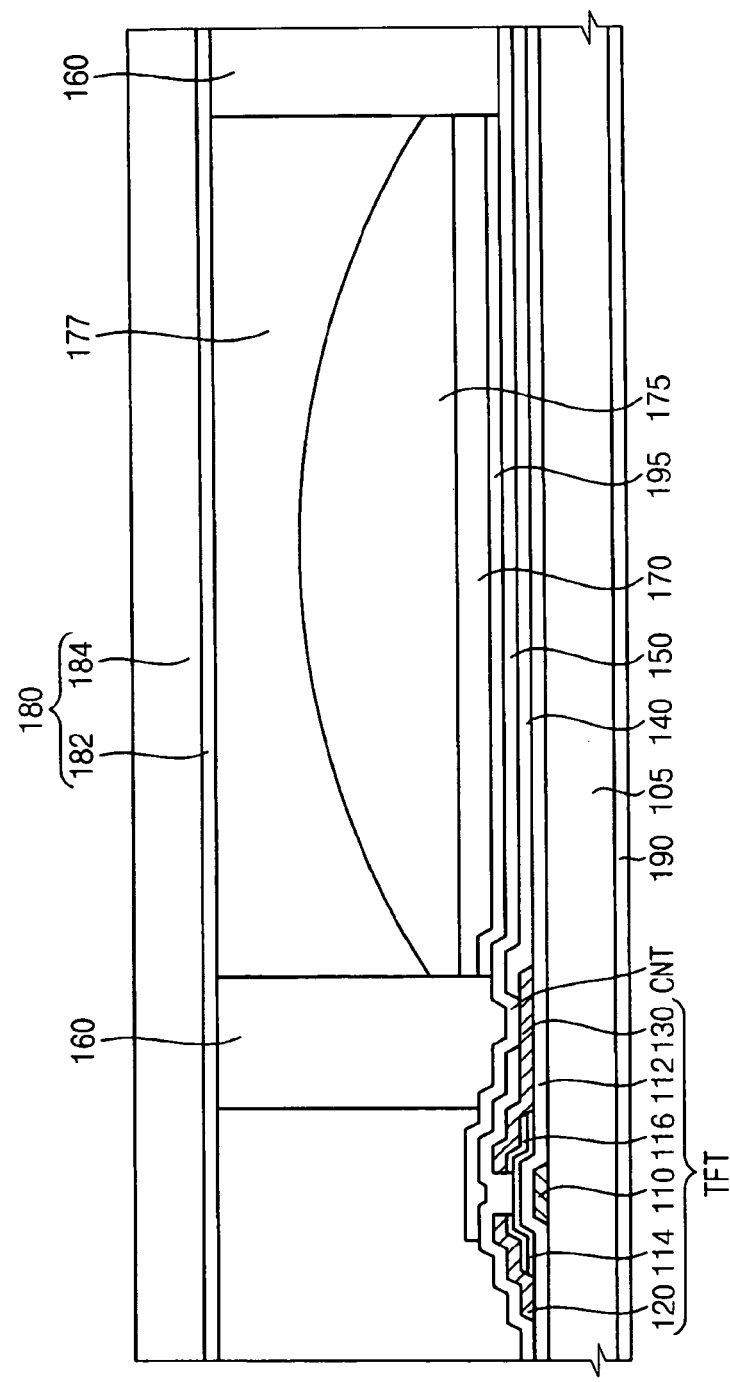
FIG. 4 is a cross-sectional view illustrating a unit pixel of the electro-wetting display panel in accordance with an example embodiment of the present invention.

In the embodiment depicted in FIGS. 3 and 4, the electro-wetting display panel receives the conductive colored liquid in the space bounded by the partition wall formed on the array substrate 105. Alternatively, the electro-wetting display panel may receive the conductive colored liquid in a space defined by the partition wall formed on the opposite substrate 180.

FIG. 4 is a cross-sectional view illustrating a unit pixel of an electro-wetting display panel in accordance with another example embodiment of the present invention which includes some elements substantially the same as those in FIG. 3 and therefore bear the same reference numerals. A reflective plate 195 is arranged between the pixel electrode 150 and the non-aqueous liquid 175. The reflective plate 195 includes a white-colored material. Although pixel electrode 150 includes a transparent material such as indium tin oxide (ITO) and the reflective plate 195 are separately illustrated in FIG. 4, the reflective plate may be excluded by employing a pixel electrode having a white-colored material.

Figure 5A:
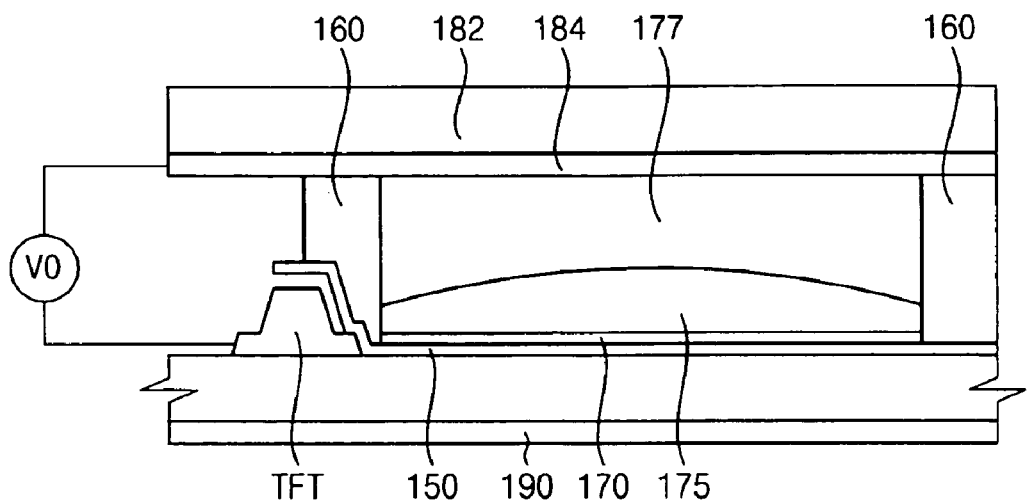
FIGS. 5A and 5B are cross-sectional views illustrating operations of the electro-wetting display panel in accordance with an example embodiment of the present invention.
Figure 5B:
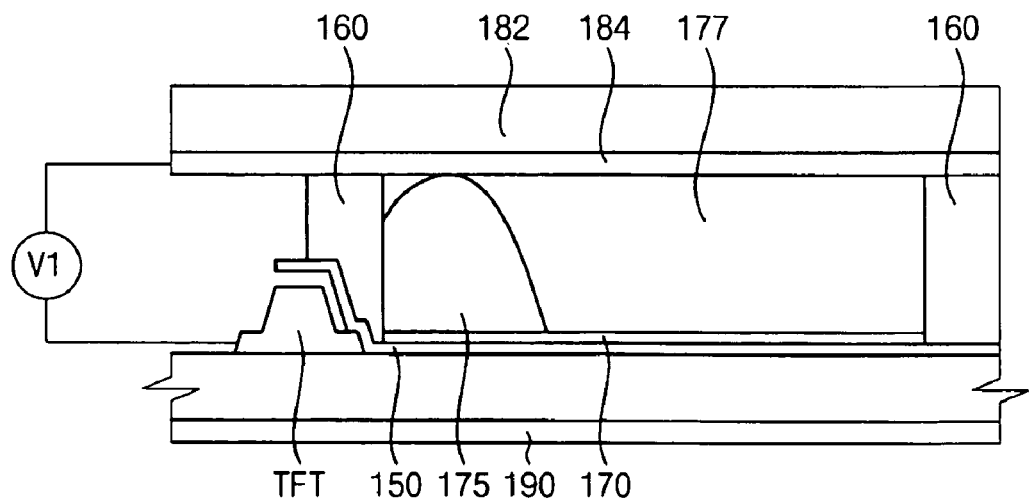

FIGS. 5A and 5B are cross-sectional views that illustrate the operation of the electro-wetting display device according to the application of a gate-on-voltage and a gate-off-voltage. When the thin-film transistor is maintained in an off state, there is no potential difference between the pixel electrode 150 and the common electrode 184 because pixel electrode 150 is maintained in a floating state. Accordingly, the non-aqueous liquid 175 contained in a region defined by the partition wall 160 is maintained in a substantially spread state. When the thin-film transistor turns on, the data voltage transmitted from the data line is applied to the pixel electrode 150, and the common electrode voltage ($V_{com}$) is applied to the common electrode 184 so that a predetermined potential difference between the pixel electrode 150 and the common electrode 184 is generated. In response to the application of the potential difference, the non-aqueous liquid 175 contained in a region defined by the partition wall 160 contracts. For convenience of illustration, although the contracted state of the non-aqueous liquid 175 having a minimal surface area is illustrated in FIG. 5B to be arranged adjacent to the TFT, various contracted states of the non-aqueous liquid 175 may be possible.

Figure 6:
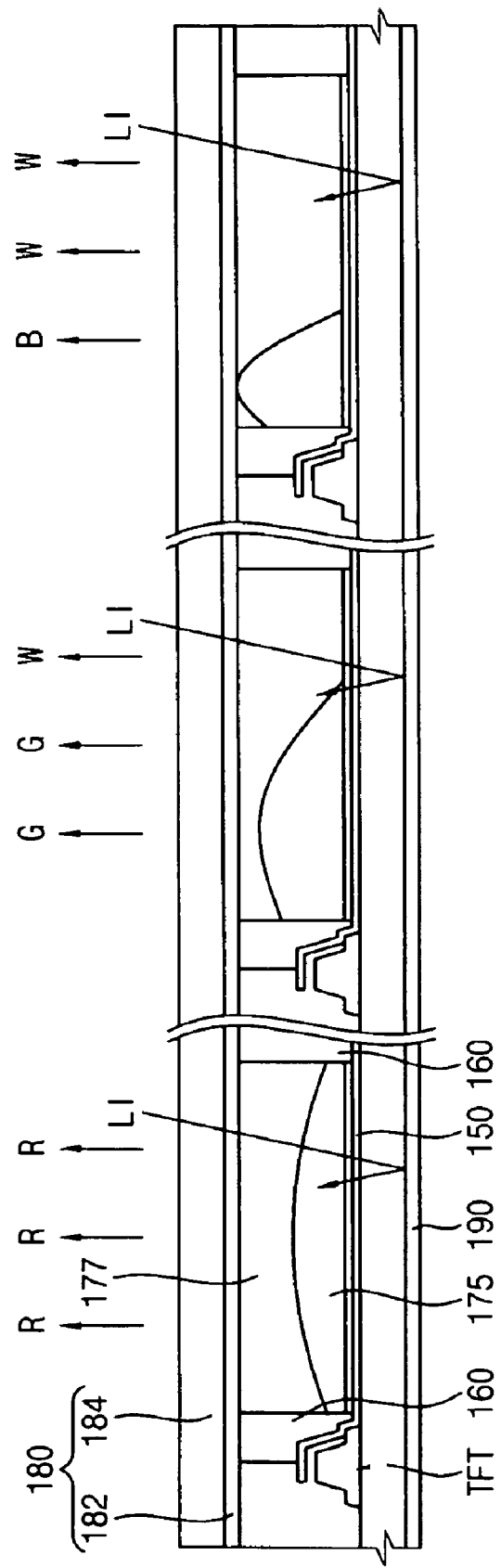
FIG. 6 is a cross-sectional view illustrating light reflectivity according to a data voltage applied to the unit pixels.

FIG. 6 is a cross-sectional view illustrating light reflectivity according to a data voltage applied to the unit pixels. Referring to FIG. 6, the conductive colored liquid having a red color fills in a left pixel region, the conductive colored liquid having a green color fills in a middle pixel region and the conductive colored liquid having a blue color fills in a right pixel region. In the left pixel region, a free or relatively low level of potential difference is generated between the pixel electrode 150 and the common electrode 182. According to the free or relatively low level of potential difference, the conductive colored liquid having a red color is maintained in the spread state in the entire left pixel region. Therefore, an external incident light LI is reflected by a reflecting plate 190 so that a red light passes through the whole left pixel region.

In the middle pixel region, a relatively middle level of potential difference is generated between the pixel electrode 150 and the common electrode 182. According to the relatively middle level of potential difference, the conductive colored liquid having a green color is maintained in the spread state in about two-thirds of the middle pixel region. In about one-third of the middle pixel region, the conductive colored liquid is maintained in the contracted state for exposing a sub-layer. Therefore, the external incident light LI is reflected by the reflecting plate 190 so that a green light passes through the about two-thirds of the middle pixel region and a white light passes through the about one-third of the middle pixel region.

In the right pixel region, a relatively high level of potential difference is generated between the pixel electrode 150 and the common electrode 182. According to the relatively high level of potential difference, the conductive colored liquid having a blue color is maintained in the spread state in about one-third of the right pixel region. In about two-thirds of the right pixel region, the conductive colored liquid is maintained in the contracted state for exposing a sub-layer. Therefore, the external incident light LI is reflected by the reflecting plate 190 so that a blue light passes through the about one-third of the middle pixel region and a white light passes through the two-thirds of the right pixel region.

As illustrated above, the surface area of the conductive colored liquid is changed in response to the applied potential difference between the pixel electrode and the common electrode. According to the changed surface area, the amount of the reflected light is controlled to display an image having various gray scales.

Method of Manufacturing an Electro-wetting Display Panel

EXAMPLE EMBODIMENT 1

Figure 7A:
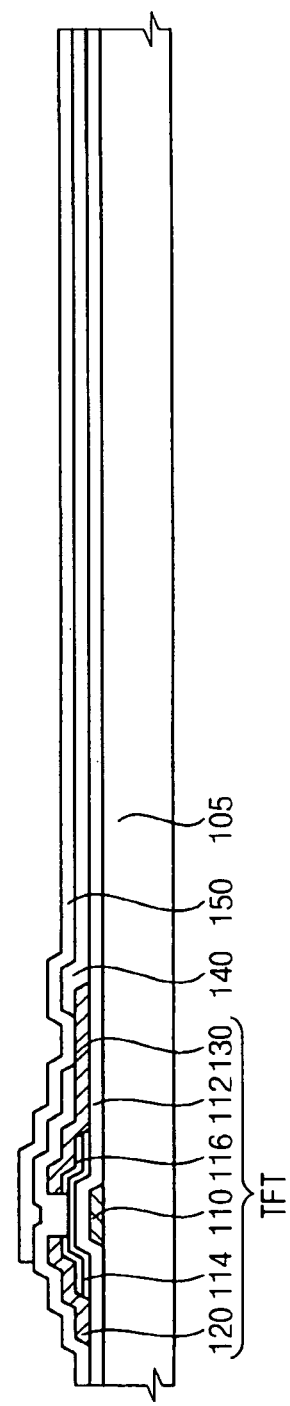

FIGS. 7A to 7F are cross-sectional views illustrating a method of manufacturing an electro-wetting display panel in accordance with a first embodiment of the present invention. Particularly, FIGS. 7A to 7F illustrate a method of manufacturing an electro-wetting display panel by a photo process. Referring to FIG. 7A, a metal layer including tantalum (Ta), titanium (Ti), molybdenum (Mo), aluminum (Al), chromium (Cr), copper (Cu), tungsten (W), etc., is formed on a first transparent substrate including an insulation material such as glass, ceramic, etc. Sequentially, a plurality of scan lines and a gate electrode 110 extending from the scan lines are formed by patterning the metal layer. The scan lines extend in a lateral direction and are arranged in a longitudinal direction that is substantially perpendicular to the lateral direction. The gate insulation layer 112 is formed on the whole substrate having the gate electrode 110 by depositing a material such as silicon nitride by plasma-enhanced chemical vapor deposition (PECVD) process. The gate insulation layer 112 may be formed as a whole on the first transparent substrate or may be patterned to cover the scan lines and the gate electrode 110.

Sequentially, an amorphous silicon layer and an in-situ doped n$^+$ amorphous silicon layer are formed on the gate insulation layer 112. The amorphous silicon layer and the in-situ doped n$^+$ amorphous silicon layer are patterned to form a semiconductor layer 114 and an impurity semiconductor layer 116 on the region where the gate electrode is positioned. A metal layer including tantalum (Ta), titanium (Ti), molybdenum (Mo), aluminum (Al), chromium (Cr), copper (Cu), tungsten (W), etc., is formed. The metal layer is then patterned to form a plurality of data lines and a source electrode 120 extending from the data lines and a drain electrode 130 spaced apart from the source electrode 120 by a predetermined interval. A passivation layer 140 is formed by stacking a resist by a spin-coating process. The passivation layer 140 is partially opened to expose the drain electrode 130. A pixel electrode 150 electrically connected to the drain electrode 130 through the opening in a unit pixel region is formed on the passivation layer 140.

In one example, the pixel electrode 150 includes a transparent conductive material. Examples of the transparent conductive material may include indium tin oxide (ITO), indium zinc oxide (IZO), zinc oxide (ZO), etc. Here, after the transparent conductive material is entirely formed on the passivation layer 140, the transparent conductive material may be patterned to form the pixel electrode 150 corresponding to the unit pixel region. Alternatively, the transparent conductive material may be partially formed in the unit pixel region to form the pixel electrode 150. In another example, the pixel electrode includes a white-colored material having good reflective efficiency. Accordingly, the reflective plate arranged in a rear side of the electro-wetting display panel may be excluded.

Figure 7B:
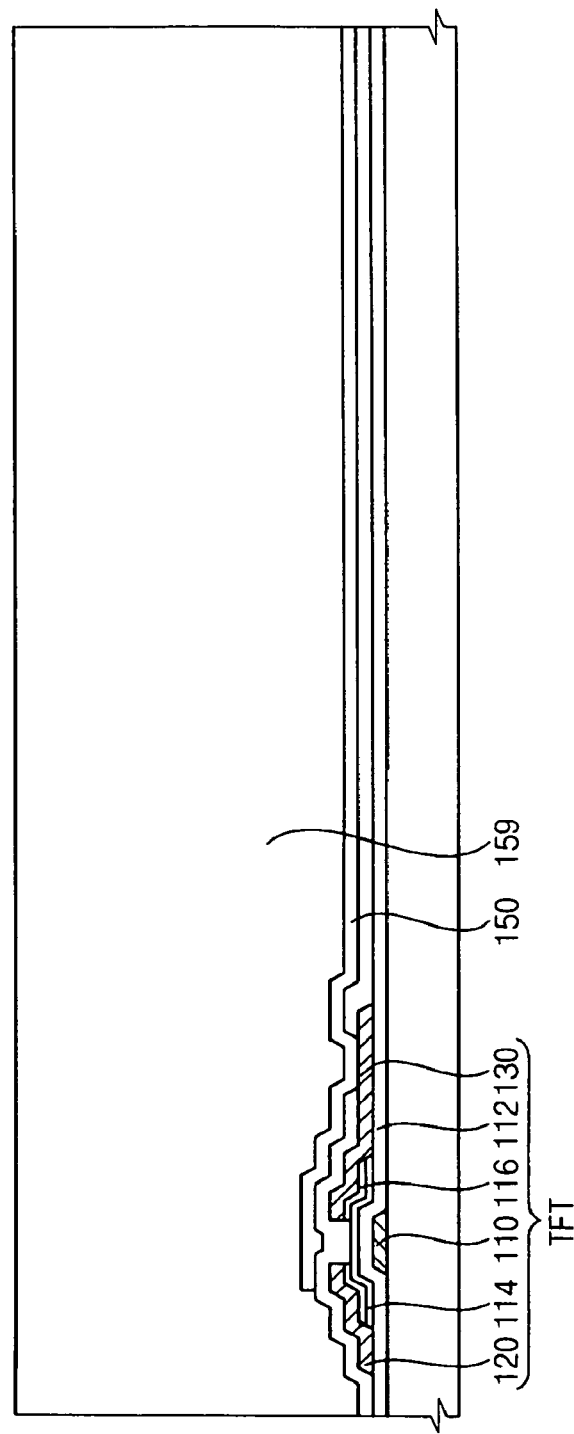

Referring to FIG. 7B, a predetermined thickness of a first organic insulation layer 159 is formed on the passivation layer 140 and the pixel electrode 150. A height of the first organic insulation layer 159 may preferably corresponds to a cell gap. Referring to FIG. 7C, a photo mask (MA) having an opaque member, which corresponds to the unit pixel region, is positioned over the first organic insulation layer 159 in order to define the unit pixel region. By performing an exposure process, a development process, an etching process and a strip process sequentially, portions of the first organic insulation layer 159 corresponding to the containing region are removed. Accordingly, a partition wall 160 that serves to contain a conductive colored liquid is formed. The partition wall 160 serves as a spacer for maintaining the cell gap between an array substrate and an opposite substrate as well as a container for receiving the conductive colored liquid that is a mixture of an aqueous liquid and a non-aqueous colored oil. Therefore, the partition wall is preferably formed in a region without the unit pixel region or in a region without the unit pixel region and a thin-film transistor region.

Referring to FIG. 7D, a hydrophobic insulation layer 170 is formed by injecting a non-aqueous liquid filled in a first tank (TNK1) into the containing region defined by the partition wall 160 by an inkjet injection process. Alternatively, the hydrophobic insulation layer 170 may be formed by a spin-coating process. Referring to FIG. 7E, by injecting a non-aqueous liquid filled in a second tank (TNK2) into a space surrounded by the hydrophobic insulation layer 170 and the partition wall 160 by the inkjet injection process, the space is partially filled with a non-aqueous liquid 175 having a predetermined volume. Preferably, the non-aqueous liquid includes a colored oil. The colored oil may include a red-colored oil, a blue-colored oil or a green-colored oil.

Figure 7F:
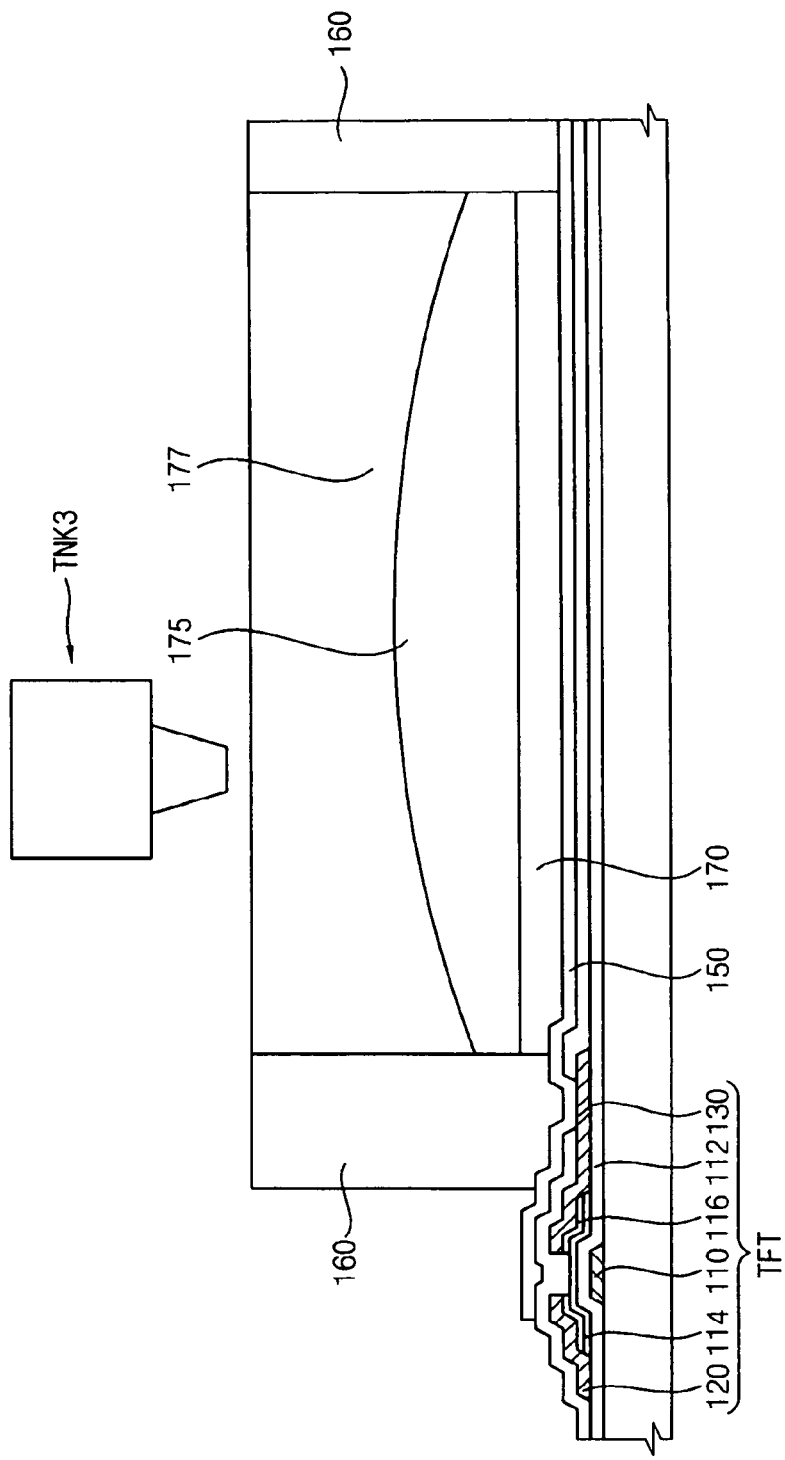

Referring to FIG. 7F, the space surrounded by a non-aqueous liquid 175 and the partition wall 160 is fully filled with an aqueous liquid 177 by using an inkjet process to inject the aqueous liquid from a third tank (TNK3) before the non-aqueous liquid runs dry. As illustrated in FIG. 3, a common electrode 184 formed on a second transparent substrate 182 is arranged for allowing the common electrode 184 to make contact with the aqueous liquid 177 so that the conductive colored liquid filled in a space defined by the partition wall is enclosed, thereby completing the electro-wetting display panel.

EXAMPLE EMBODIMENT 2

Figure 8A:
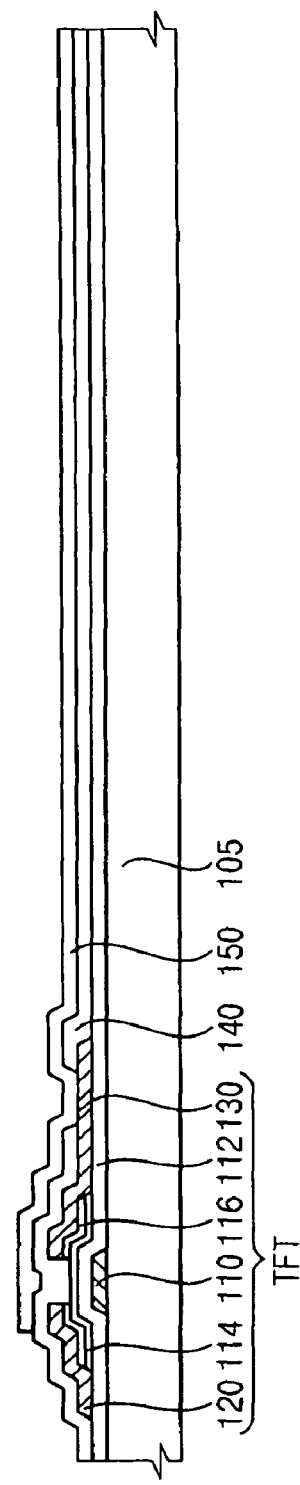
Figure 8B:
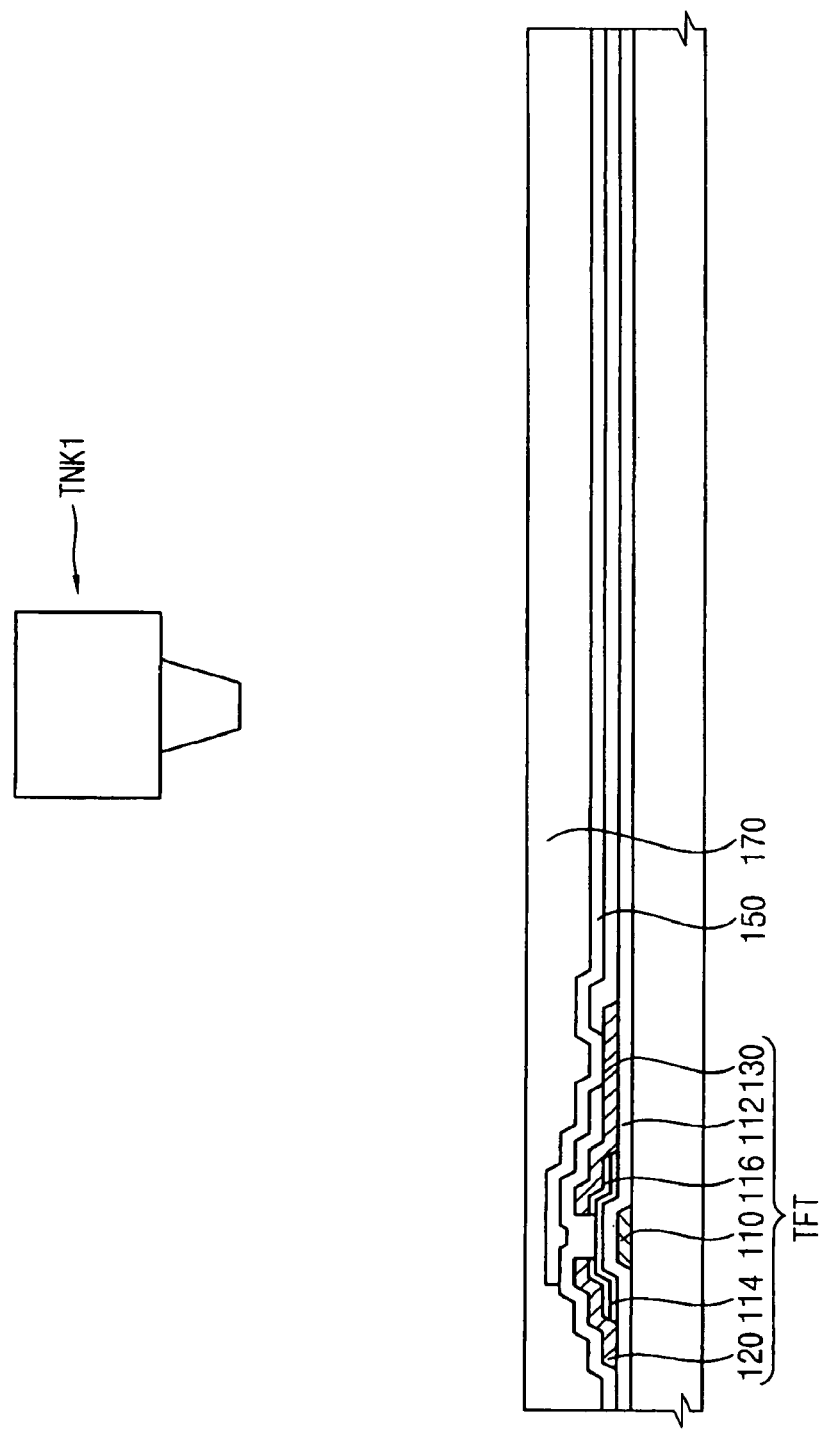

FIGS. 8A to 8F are cross-sectional views illustrating a method of manufacturing an electro-wetting display panel in accordance with a second example embodiment of the present invention. Particularly, FIGS. 8A to 8F illustrate a method of manufacturing an electro-wetting display panel by a photo process. Processes described with respect to FIG. 8A are substantially the same as those described with respect to FIG. 7A, so that the same reference numerals refer to the same elements. Referring to FIG. 8B, a hydrophobic insulation layer 170 is formed by injecting a non-aqueous liquid filled in a first tank (TNK1) onto the passivation layer 140 and the pixel electrode 150. A hydrophobic insulation layer 170 is then dried. Alternatively, the hydrophobic insulation layer 170 may be formed by a spin-coating process.

Figure 8C:
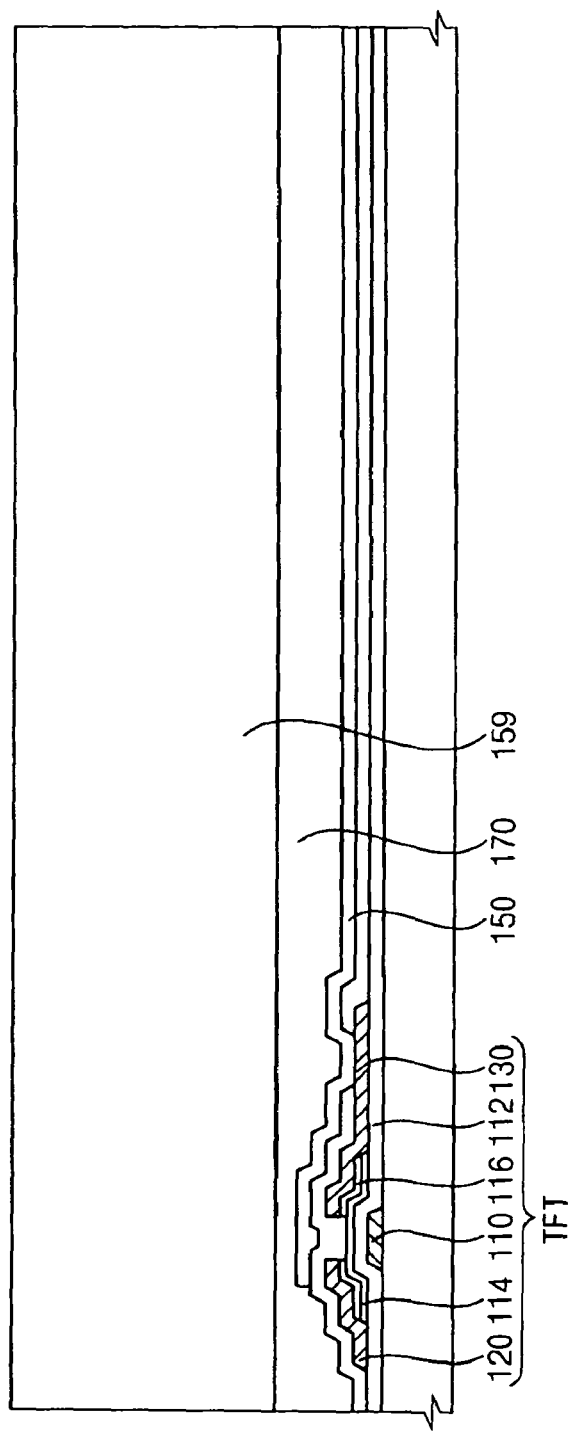

Referring to FIG. 8C, a predetermined thickness of first organic insulation layer 159 is formed on the hydrophobic insulation layer 170. A height of the first organic insulation layer preferably corresponds to a cell gap. Referring to FIG. 8D, a photo mask (MA) having an opaque member, which corresponds to the unit pixel region, is positioned over the first organic insulation layer 159 in order to define the unit pixel region. By performing an exposure process, a development process, an etching process and a strip process sequentially, portions of the first organic insulation layer 159 corresponding to the containing region are removed. Accordingly, a partition wall 160 that serves to contain a conductive colored liquid is formed. The partition wall 160 serves as a spacer for maintaining the cell gap between an array substrate and an opposite substrate as well as a container for receiving the conductive colored liquid that is a mixture of an aqueous liquid and a non-aqueous colored oil. Therefore, the partition wall is preferably formed in a region without the unit pixel region or in a region without the unit pixel region and a thin-film transistor region.

Referring to FIG. 8E, by injecting a non-aqueous liquid filled in a second tank (TNK2) into a space surrounded by the hydrophobic insulation layer 170 and the partition wall 160 by the inkjet injection process, the space is partially filled with a non-aqueous liquid 175 having a predetermined volume. Preferably, the non-aqueous liquid includes a colored oil. The colored oil may include a red-colored oil, a blue-colored oil or a green-colored oil. Referring to FIG. 8F, a space surrounded by a non-aqueous liquid 175 and the partition wall 160 is fully filled with an aqueous liquid 177 by injecting an aqueous liquid filled in a third tank (TNK3) into the space by an inkjet injection process before the non-aqueous liquid runs dry. Sequentially, illustrated in FIG. 3, a common electrode 184 formed on a second transparent substrate 182 is arranged for allowing the common electrode 184 to make contact with the aqueous liquid 177 so that the aqueous liquid 177 is enclosed, thereby completing the electro-wetting display panel. The pixel electrode illustrated in FIGS. 8A to 8F may include a white-colored material having good reflective efficiency. Therefore, the reflective plate arranged in a rear side of the electro-wetting display panel may be excluded.

EXAMPLE EMBODIMENT 3

Figure 9A:
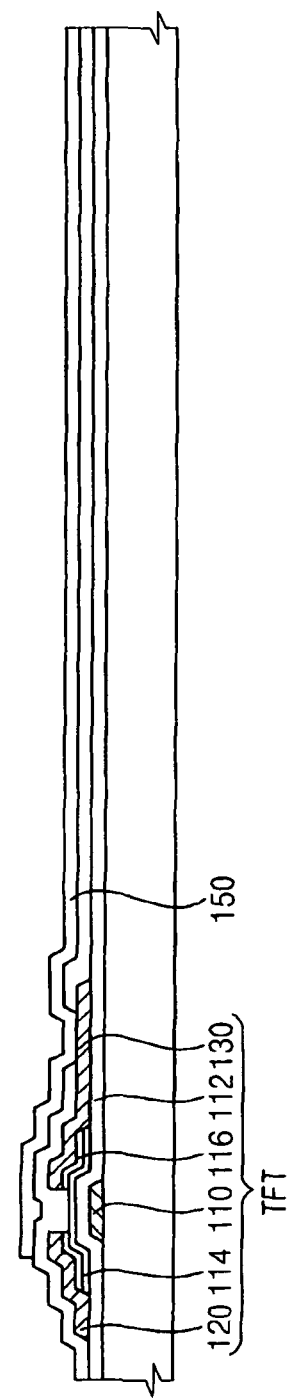
Figure 9B:
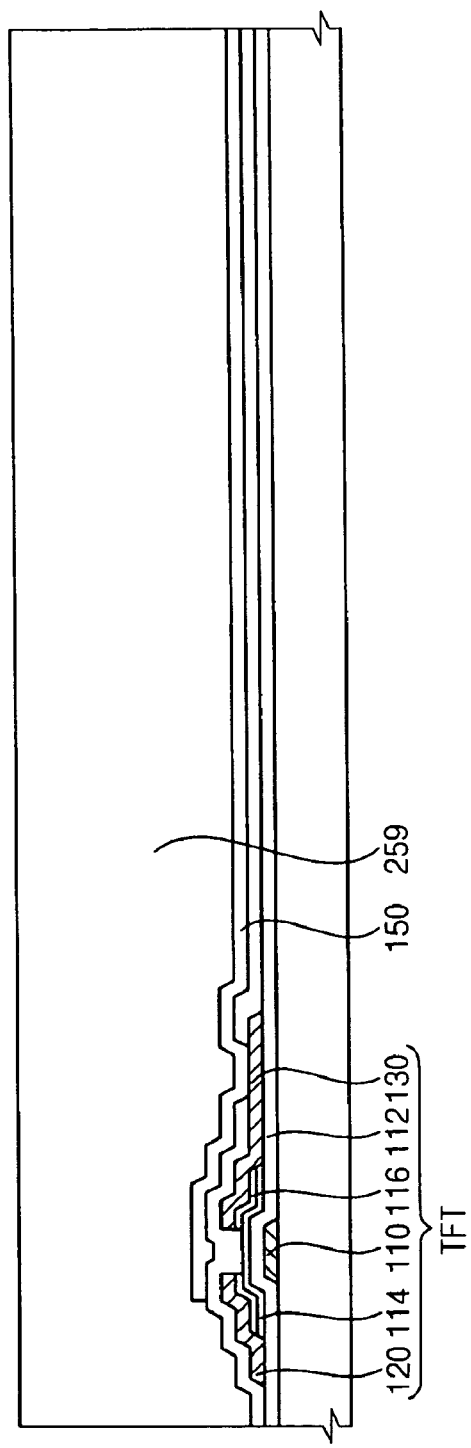

FIGS. 9A to 9G are cross-sectional views illustrating a method of manufacturing an electro-wetting display panel in accordance with a third example embodiment of the present invention. Particularly, FIGS. 9A to 9G illustrate a method of manufacturing an electro-wetting display panel by an imprint process (i.e., stamp process). Processes described with respect to FIG. 9A are substantially the same as those described with respect to FIG. 7A so that the same reference numerals refer to the same elements. Referring to FIG. 9B, a second organic insulation layer 259 having a predetermined thickness is formed on the passivation layer 140 and the pixel electrode 150. A height of the second organic insulation layer 259 may be lower than that of the first organic insulation layer 159 illustrated in FIG. 7B considering that a partition wall is formed by an imprint process.

Figure 9C:
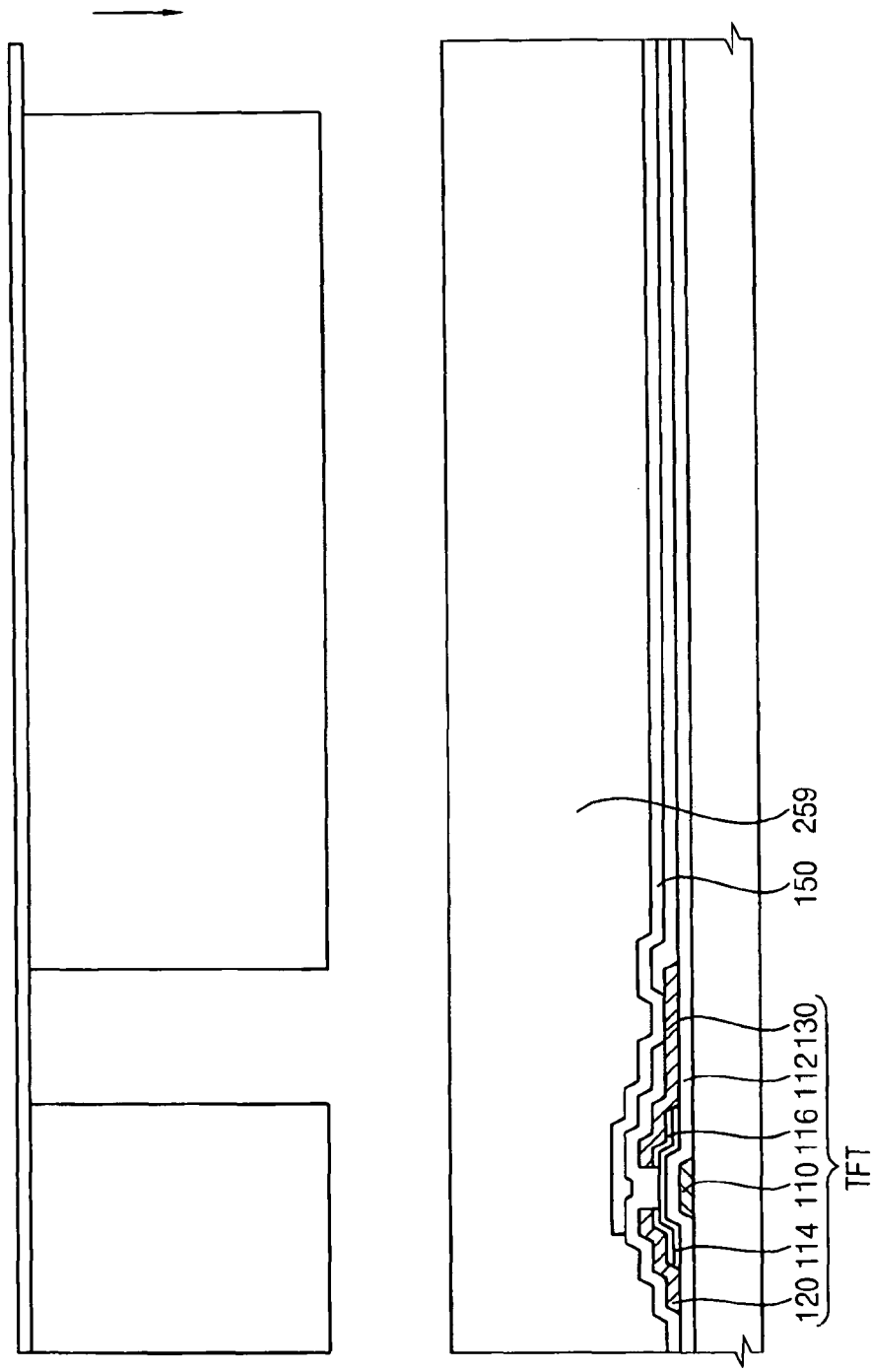
Figure 9D:
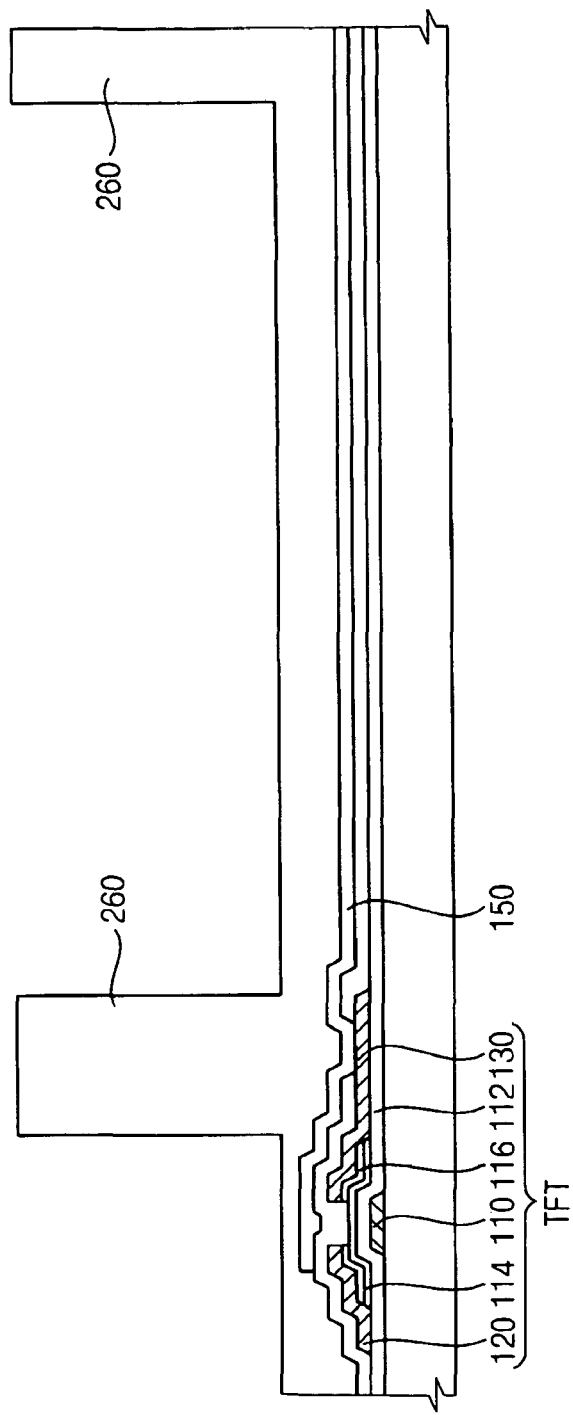

Referring to FIG. 9C and FIG. 9D, in order to define the unit pixel region, a stamper (STM) having a protruding member, which corresponds to the unit pixel region, is positioned on the second organic insulation layer 259, and the substrate is pressed by a predetermined force using the stamper. The protruding member has a closed loop shape surrounding edge regions of the pixel electrode. Accordingly, the second organic insulation layer 259 where the protruding member positions moves to a region where the protruding member is not formed so that a partition wall 260 that serves to contain a conductive colored liquid is formed. Although the second organic insulation layer 259 remains to be a predetermined thickness after the imprint process in FIG. 9D, the remaining second organic insulation layer 259 except for a region corresponding to the partition wall 260 may be completely removed.

Figure 9E:
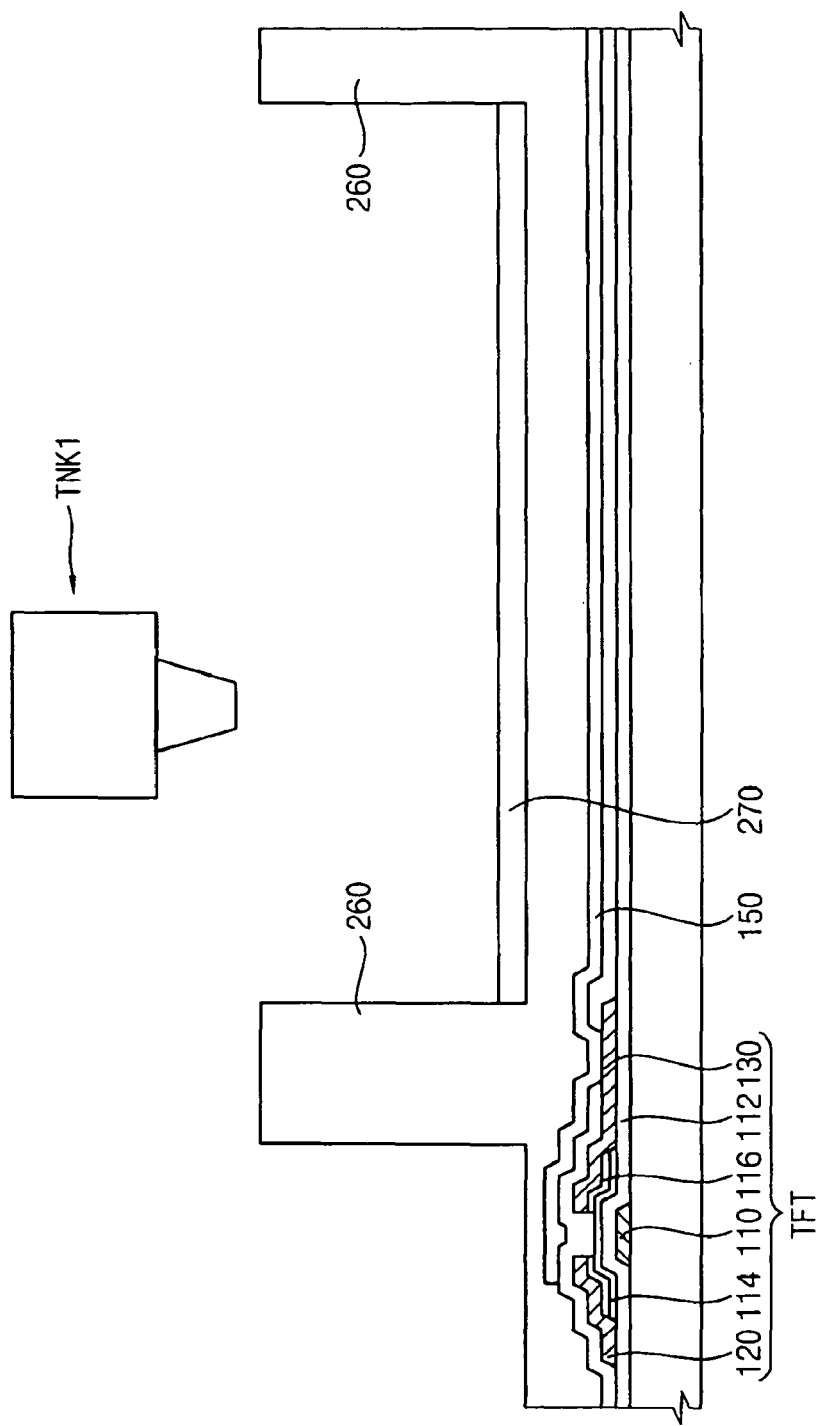
Figure 9F:
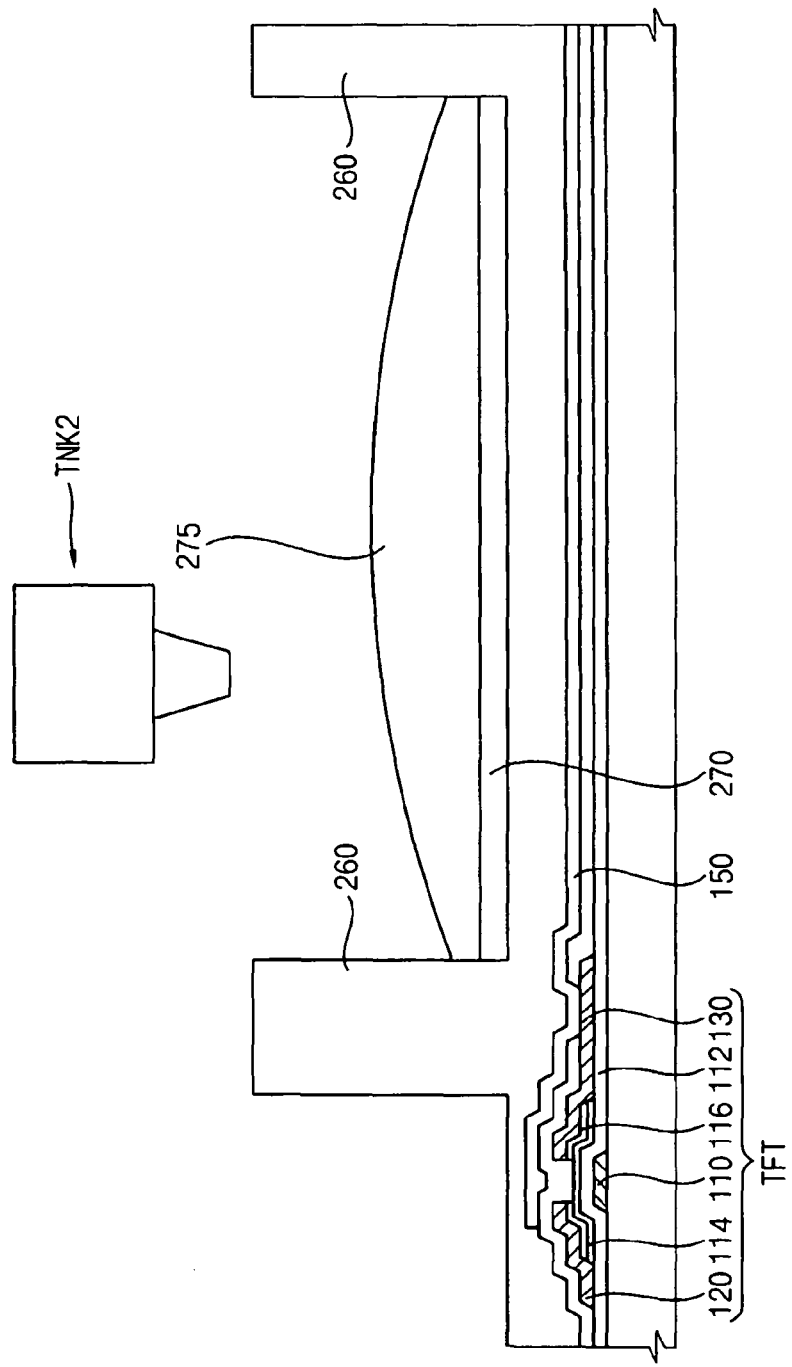

Referring to FIG. 9E, a hydrophobic insulation layer 270 is formed by injecting a non-aqueous liquid filled in a first tank (TNK1) into a containing region defined by the partition wall 260 by an inkjet injection process. Alternatively, the hydrophobic insulation layer 270 may be formed by a spin-coating process. Referring to FIG. 9F, by injecting a non-aqueous liquid filled in a second tank (TNK2) into a space surrounded by the hydrophobic insulation layer 270 and the partition wall 260 by the inkjet injection process, the space is partially filled with a non-aqueous liquid 175 having a predetermined volume. Preferably, the non-aqueous liquid includes a colored oil. The colored oil may include a red-colored oil, a blue-colored oil or a green-colored oil. Referring to FIG. 9G, a space surrounded by a non-aqueous liquid 275 and the partition wall 260 is fully filled by injecting an aqueous liquid filled in a third tank (TNK3) into the space by the inkjet injection process before the non-aqueous liquid runs dry. As illustrated in FIG. 3, a common electrode 184 formed on a second transparent substrate 182 for allowing the common electrode 184 to make contact with the aqueous liquid 177 so that the conductive colored liquid filled in a space defined by the partition wall is closed, thereby completing the electro-wetting display panel.

According to the present invention, a partition wall that serves to contain a liquid used in an electro-wetting process is formed on an array substrate where a thin-film transistor and a pixel electrode are formed. The partition wall may be formed by a photo process or an imprint process on an organic layer. The hydrophobic insulation layer 170 is formed on a bottom face of the predetermined spaces defined by the partition wall 160 by the spin-coating process or the inkjet injection process. The liquid used in the electro-wetting process (i.e., a non-aqueous liquid and an aqueous liquid) is sequentially injected into a space surrounded by the hydrophobic insulation layer and the partition wall by an inkjet injection process. Thereafter, the liquid used in the electro-wetting process is enclosed by the opposite substrate where the common electrode is formed. According to the present invention, the active matrix type array substrate is used for a lower substrate of the electro-wetting display panel so that costs and time for manufacturing the electro-wetting display panel may be reduced.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display panel comprising:
   an array substrate having a switching device and a pixel electrode electrically connected to the switching device;
   an opposite substrate facing and above the array substrate;
   a conductive colored liquid filled in a region corresponding to the pixel electrode, the conductive colored liquid controlling light transmissivity by being transformed according to an electric signal applied to the pixel electrode; and
   a partition wall disposed between the array substrate and the opposite substrate to enclose the conductive colored liquid, wherein the partition wall is disposed on and above a portion of the pixel electrode.

2. The display panel of claim 1, further comprising a hydrophobic insulation layer formed on the pixel electrode, wherein the conductive colored liquid comprises a colored oil and an aqueous liquid.

3. The display panel of claim 1, wherein the partition walls are overlaid to correspond to the scan line and the data line.

4. The display panel of claim 1, wherein the partition wall comprises an organic insulation layer.

5. The display panel of claim 1, further comprising a reflective plate arranged under the conductive colored liquid to reflect light by being selectively exposed in accordance with a spreading or a contraction of the conductive colored liquid.

6. The display panel of claim 5, wherein the reflective plate is arranged at a rear side of the array substrate.

7. The display panel of claim 5, wherein the reflective plate is arranged between the pixel electrode and the conductive colored liquid.

8. The display panel of claim 5, wherein the pixel electrode has a white color and wherein the reflective plate comprises a white-colored pixel electrode.

9. The display panel of claim 5, wherein the reflective plate has a white color.

10. The display panel of claim 1, wherein the switching device is a thin film transistor connected to a data line and a scan line crossing the data line.

11. A display panel comprising:
    a first substrate including a pixel region;
    a pixel electrode formed on the pixel region;
    a partition wall surrounding edge regions of the pixel electrode;
    a hydrophobic insulation layer formed on and above the pixel electrode that is surrounded by the partition wall;
    a conductive colored liquid formed in a region defined by the partition wall;
    a second substrate combined with the first substrate to enclose the conductive colored liquid contained by the partition wall; and a switching device formed on the first substrate to provide an electric signal to the pixel electrode in order to cause spreading or contraction of the conductive colored liquid, wherein the partition wall is disposed between the first substrate and the second substrate to enclose the conductive colored liquid and the partition wall is disposed on and above a portion of the pixel electrode.

12. The display panel of claim 11, wherein the switching device is a thin film transistor connected to a data line and a scan line crossing the data line.

* * * * *